United States Patent [19]

Tracy et al.

[11] Patent Number: 4,963,012
[45] Date of Patent: Oct. 16, 1990

[54] PASSIVATION COATING FOR FLEXIBLE SUBSTRATE MIRRORS

[75] Inventors: C. Edwin Tracy; David K. Benson, both of Golden, Colo.

[73] Assignee: The United States of America as represented by the United States Department of Energy, Washington, D.C.

[21] Appl. No.: 259,634

[22] Filed: Oct. 19, 1988

Related U.S. Application Data

[63] Continuation-in-part of Ser. No. 873,069, Jun. 4, 1986, Pat. No. 4,780,372, which is a continuation of Ser. No. 632,742, Jul. 20, 1984, abandoned.

[51] Int. Cl.$^5$ .......................... G02B 5/08; G02B 7/18
[52] U.S. Cl. .................................. 350/641; 350/164; 350/166; 350/320
[58] Field of Search ........ 350/641, 642, 582, 164–166, 350/320; 428/428, 434, 460–463

[56] References Cited

U.S. PATENT DOCUMENTS

| | | | |
|---|---|---|---|
| 4,097,889 | 6/1978 | Kern et al. | 427/94 |
| 4,273,828 | 6/1981 | Tracy et al. | 428/136 |
| 4,341,841 | 7/1982 | Ohno et al. | 350/641 |
| 4,451,119 | 5/1984 | Meyers et al. | 350/641 |
| 4,482,209 | 11/1984 | Grewal et al. | 350/642 |
| 4,487,196 | 12/1984 | Murphy | 126/438 |
| 4,517,217 | 5/1985 | Hoffman | 428/428 |
| 4,780,372 | 10/1988 | Tracy et al. | 350/641 |

OTHER PUBLICATIONS

Kern & Rosler, Advances in Deposition Process for Passivation Films, J. of Vac.Sci & Techno. vol. 13, No. 5, pp. 1082–1099, 1977.
Milek, Silicon Nitride for Microelectronic Applications, Handbook of Electronic Materials, vol. 3, IFI/-Plenuj. NY, N.Y., pp. 10–13 (1971), SERI/TR-31-042.
SERI Materials Branch Semiannual Report, Jan. 1, 1978–Jun. 30, 1978, Solar Energy Research Institute, Golden, Colo. (1978).
SERI/RR-31-145, Solar Glass Mirror Program A Planning Report on Near-Term Mirror Development Activities, Solar Energy Research Institute, Golden, Colo. (1979).
Vossen and Kern, Thin Film Processes, Academic Press, NY, N.Y. (1978).
R. B. Pettit & C. J. Brinker, Use of Sol-Gel Thin Films in Solar Energy Applications, SPIE vol, 562, Optical Materials Technology for Energy Efficiency and Solar Energy Conversion IV, pp. 256–268 (1985).

*Primary Examiner*—Bruce Y. Arnold
*Assistant Examiner*—Thong Nguyen
*Attorney, Agent, or Firm*—Kenneth Richardson; John M. Albrecht; William R. Moser

[57] ABSTRACT

A protective diffusion barrier for metalized mirror structures is provided by a layer or coating of silicon nitride which is a very dense, transparent, dielectric material that is impervious to water, alkali, and other impurities and corrosive substances that typically attack the metal layers of mirrors and cause degradation of the mirrors' reflectivity. The silicon nitride layer can be deposited on the substrate before metal deposition thereon to stabilize the metal/substrate interface, and it can be deposited over the metal to encapsulate it and protect the metal from corrosion or other degradation. Mirrors coated with silicon nitride according to this invention can also be used as front surface mirrors. Also, the silver or other reflective metal layer on mirrors comprising thin, lightweight, flexible substrates of metal or polymer sheets coated with glassy layers can be protected with silicon nitride according to this invention.

25 Claims, 6 Drawing Sheets 4,963,012

PASSIVATION COATING FOR FLEXIBLE SUBSTRATE MIRRORS

CONTRACTUAL ORIGIN OF THE INVENTION

The U.S. Government has rights in this invention pursuant to Contract No. DE-AC02-83CH10093 between the U.S. Dept. of Energy and the Solar Energy Research Institute, a Division of the Midwest Research Institute.

BACKGROUND OF THE INVENTION

1. Reference to Related Patent

This is a continuation-in-part of copending U.S. Pat. Application, Ser. No. 06/873,069, filed June 4, 1986, now U.S. Pat. No. 4,780,372, which was a continuation of U.S. Patent Application, Ser. No. 06/632,742, filed July 20, 1984, now abandoned.

2. Field of the Invention

The present invention relates to mirrors and, more particularly, to a passivation layer for the reflective silver or other metal layer of a flexible mirror to protect the reflective metal layer from degradation.

3. Description of the Prior Art

Most commercial mirrors are silvered glass composite structures wherein a thin layer of silver is deposited on the surface of a glass substrate to reflect light. Silver is preferred because its reflectivity is significantly greater than other metals, although other metals can be used. A common commercial process for fabricating such mirrors is known as a wet chemical electroless process, wherein a thin layer of chemically reduced silver is precipitated onto a sensitized glass surface. In order to protect the silver layer from damage and degradation, a protective coating is applied to its exposed surface. A common protective coat comprises a copper layer deposited over the silver layer, with a thick enamel paint spread over the copper layer. The copper layer interposed between the silver and paint layers enhances adhesion of the paint to the silver. A typical composite silvered glass mirror structure is shown in FIG. 1.

Silvered glass mirrors structured as described above have been used indoors without significant problems for many years. The more recent interest in use of mirrors for solar collector applications, such as heliostats, has resulted in more out door test installations of mirrors. While such tests have indicated economic feasibility of mirrored solar collector concepts from an energy standpoint, they unfortunately also revealed that conventional silvered glass mirrors do not stand up very well in outdoor environments. In fact, the reflective properties of most conventional mirrors undergo substantial degradation of their reflective properties within several months to several years in outdoor environments, which is a relatively short time when a useful life of 20 years is generally considered to be a minimum design requirement for economical solar collector installations.

There have also been recent developments in using thin sheets of flexible, rolled metal, such as stainless steel or aluminum foil, for substrates in silvered or other reflective metal mirrors. These flexible sheet mirror structures are primarily used as large, lightweight heliostat mirrors and the like in solar collector applications. See, e.g., R. B. Pettit & C. J. Brinker, "Use of Sol-Gel Thin Films in Solar Energy Applications", SPIE Vol. 562, Optical Materials Technology for Energy Efficiency and Solar Energy Conversion IV, pp. 256–268 (1985). In such applications, $SiO_2$-based sol-gel can be used to planarize the surface of the metal foil substrate by producing a silicon dioxide ($SiO_2$) layer thereon. The silver or other metal reflector surface is then plated on the $SiO_2$ layer to produce a highly specular mirror surface. However, the reflective silver or other metal layer on such mirror structures has been found to be unstable and rapidly degrades when exposed to even room atmosphere. Prior to this invention, there was no suitable passivation method available to protect these new, lightweight, mirror structures.

The exact optical and mechanical degradation mechanisms of this physicochemical corrosion process are not well understood. Environmental and electrochemical tests have shown that the corrosion reaction that occurs at the glass/metal or $SiO_2$/metal interface of a mirrored surface is extremely sensitive to interfacial environment. It is believed that collection of humidity and chemicals normally found in the atmosphere in imperfections and crevices of the plated metal surface, fabrication chemicals, glass leaching, local hot spots and stresses, and photoactivation of the surface metals produce deleterious effects and cause large variances in the durability of mirrored surfaces.

Detailed surface analyses of mirrors degraded in outdoor environments have indicated several possible mechanisms for chemically induced changes at critical interfaces, such as at the silver/glass interface. Both iron and alkali metal ions have been found to concentrate at the silver/glass interface and are suspected of reducing the silver to glass bond strength and contributing to silver degradation when water diffuses from exposed edges or from coating flaws into the silver/glass interface. This interface is also weakened by the tendency of the glass to form a hydroxide gel layer on its surface. Such gel formation is promoted by the reduction of tin complexes (sensitizers) applied on the glass surface during the wet chemical electroless process of mirror fabrication, by water adsorbed on the glass surface from the air, and by other interfacial impurities that result from subsequent steps in the fabrication process, including copper plating and enameling or painting.

To fabricate a better mirror structure that is capable of withstanding outdoor use for prolonged periods of time, such as 20 years or more, without degrading its reflective properties, it is necessary to protect the critical interfaces in the mirror from such destructive chemical reactions. Prior to this invention, such protection for mirrors was unknown.

SUMMARY OF THE INVENTION

Accordingly, it is an object of the present invention to provide a novel protective barrier around the laminated layers of a mirror structure to repel any outside humid, contaminating, or corrosive environment.

It is also an object of the present invention to stabilize the silver/glass interface in a mirror structure to protect the integrity of the silver from deleterious chemical degradation.

Another object of the present invention is to provide a passivation method for protecting and prolonging the useful life of a thin sheet mirror structure that uses a thin, flexible metal foil or other thin sheet or membrane as a substrate.

To achieve the foregoing and other objects and in accordance with the purpose of the present invention, as embodied and broadly described herein, the mirror structure of this invention may comprise a diffusion barrier layer of silicon nitride deposited on the glassy layer or coating of a substrate to form a diffusion barrier that is impervious to water and corrosive environment and a film of silver or other reflective metal deposited on the silicon nitride diffusion barrier. The layer of silicon nitride provided at the interface between the substrate and the silver provides a diffusion barrier against moisture, alkalis, and other impurities in the substrate reaching the silver.

This invention also includes the method of fabricating mirrors by depositing silicon nitride diffusion barriers both over and under the silver or other reflective metal on a substrate. Since silicon nitride is transparent and forms such a dense, effective diffusion barrier over the silver or other reflective metal, mirrors fabricated by this process can be used as front reflective mirrors.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

BRIEF DESCRIPTION OF THE DRAWINGS

The accompanying drawings, which are incorporated in and form a part of the specifications, illustrate preferred embodiments of the present invention and, and together with the description, serve to explain the principles of the invention. In the drawings.

DETAILED DESCRIPTION OF THE PREFERRED EMBODIMENTS

Figure 1:
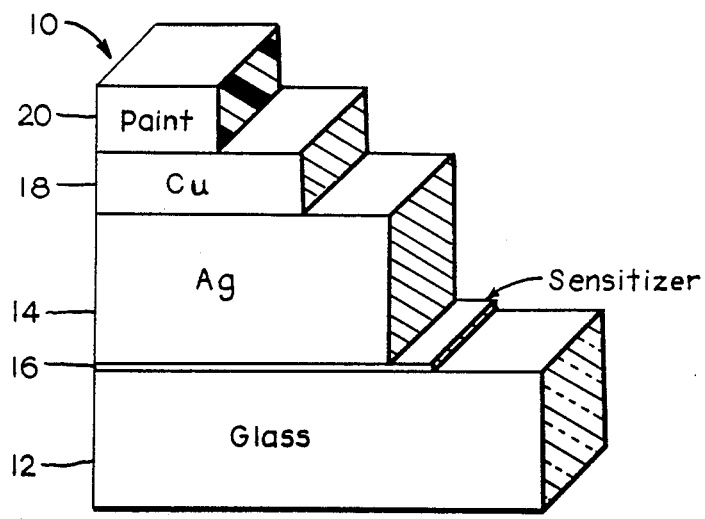
FIG. 1 is a perspective diagrammatic block view of the structure of a conventional silver glass mirror constructed according to a common wet chemical electroless process.

A typical mirror structure 10 constructed according to the conventional wet chemical electroless process is illustrated in FIG. 1. It is a composite structure comprising of a glass substrate 12 with a layer of silver (Ag) 14 coated on the glass substrate surface. A sensitizer 16, usually consisting of a tin chloride, water, and hydrochloric acid solution, is deposited on the surface of the glass substrate 12 prior to the silver to enhance adhesion of the silver layer 14 to the glass substrate 12. A paint layer 20 is coated over the mirror in an attempt to protect the mirror from the environment. However, paint layer 20 does not adhere very well to the silver layer 14. Therefore, a thin copper (Cu) layer 18 is first deposited on the silver layer 14, and the paint layer 20 is coated over the copper layer 18. The copper layer 18 also shields the silver layer 14 to some extent from the deleterious chemical degradation of the silver that could otherwise result from the ingredients and impurities in the paint layer 20.

The substantial degradation of silver/glass mirror structures 10 in outdoor environments, as discussed above, shows that the paint 20 and copper 18 layers do not provide sufficient protection.

The method of producing silver/glass mirrors according to this invention provides a much superior protective coating for both the silver layer and the silver/glass interface, where degradation of such mirrors normally occurs. This protective coating is preferably a silicon nitride material, which is a very dense, impermeable, and refractory, material that is a good dielectric and is thermally shock resistant. Silicon nitride also advantageously forms a strong, coherent, and chemically stable coating on the glass. In fact, silicon nitride is one of the few dielectric transparent materials available that has a structure dense enough not only to prevent permeation by water vapor but also to act as a diffusion barrier to many ions, including the alkalis, which attack the silver and the silver-to-glass bond.

A silicon nitride coating on mirrors is advantageous when applied in three ways. First, such a coating can be applied over the silver layer to encapsulate and hermetically seal the silver layer with the glass substrate. Second, the coating can be applied to the glass substrate surface prior to application of the silver. Third, of encapsulation and surface sealing with the silicon nitride coating combines the protective benefits of both the first and second methods.

Figure 2:
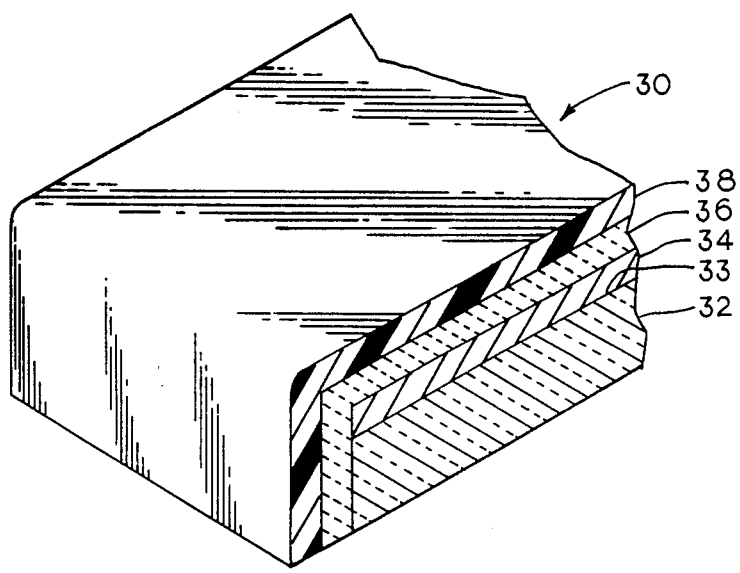
FiG. 2 is an enlarged cross-sectional view in perspective showing a mirror constructed with a protective barrier according to this invention as a surface coating.

The mirror structure 30 illustrated in FIG. 2 is an example of the use of the silicon nitride coating to cover and encapsulate the silver layer 34 with the glass substrate 32. As shown therein, the glass substrate 32 has deposited thereon a layer of silver 34 by the conventional wet chemical electroless process. A sensitizer (not shown) is applied to the silver/glass interface 33 in this process, as described above and shown in FIG. 1. The silicon nitride protective coating 36 is then deposited, as shown in FIG. 2, over the silver layer 34 and around the edges to hermetically seal the silver layer 34 and silver/glass interface 33 from the exterior environment. A paint coat 38 can then be spread over the silicon nitride layer 36, if desired. Vacuum evaporation, sputtering, ion electroplating, and other metallic plating techniques can be used as well.

The silicon nitride layer 36 in this structure provides a protective barrier to permeation of water vapor and other impurities from and through the paint coat 38 to the silver layer 34 and into the silver/glass interface 33. Thus, degradation caused by these external substances is effectively inhibited.

Figure 3:
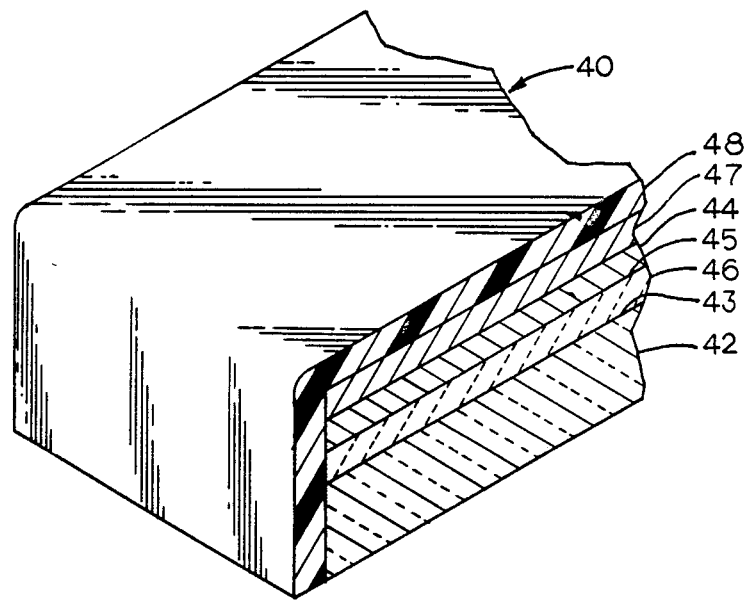
FIG. 3 is an enlarged cross-sectional view in perspective showing a mirror constructed with a protective barrier according to this invention at the silver/glass interface.

The second embodiment of this invention is shown in FIG. 3, wherein the silicon nitride layer 46 is deposited directly on the glass substrate 42. The silver layer 44 is then deposited on the silicon nitride 46. The conventional copper 47 and paint 48 coatings are provided on the exposed surface of the silver layer 44.

This second embodiment does not provide as much protection from water vapor and impurities from and through the paint coat 48 as the first embodiment. However, a significant cause of degradation of conventional silver glass mirrors is migration or leaching of alkali and water vapor through the glass to the silver/glass interface where corrosion and other deleterious chemical changes occur that can destroy the integrity of the silver and degrade the reflective properties of the silver. Therefore, the silicon nitride layer 46 deposited on the glass substrate 42, as shown in FIG. 3, serves the dual purpose of preventing alkali migration from the glass 42 to the silver/silicon nitride interface 45 and acting as an hermetic seal to any outside water vapor, thus basically stabilizing the glass surface prior to silver metalization.

Figure 4:
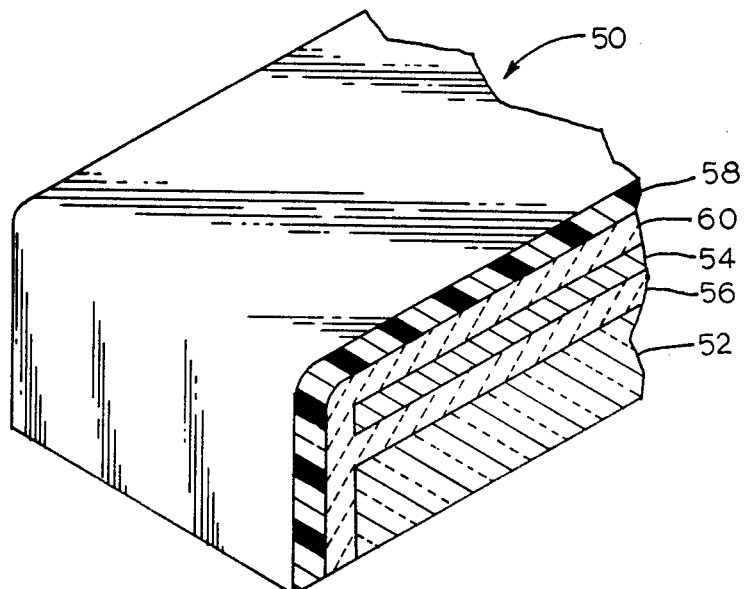
FIG. 4 is an enlarged cross-sectional view in perspective showing a mirror constructed with protective coatings according to this invention as both a silver/glass interface stabilizer and a surface coating with the silver/layer sandwiched therebetween.

The third embodiment 50, shown in FIG. 4, combines the benefits of both the first embodiment 30 and the second embodiment 40 described above and shown in FIGS. 2 and 3. In this third embodiment 50, silicon nitride layers 56, 60 are deposited over both the glass substrate 52 and the silver layer 54. Therefore, as shown in FIG. 4, the silicon nitride layers 56, 60 completely surround and enclose the silver layer 54 in a hermetic seal. In this manner, the silver layer 54 is protected from diffusion of humidity and corrosive environments as well as from leaching alkali and other impurities in the glass 52. A paint coating 58 can be provided over the composite structure, if desired.

Figure 5:
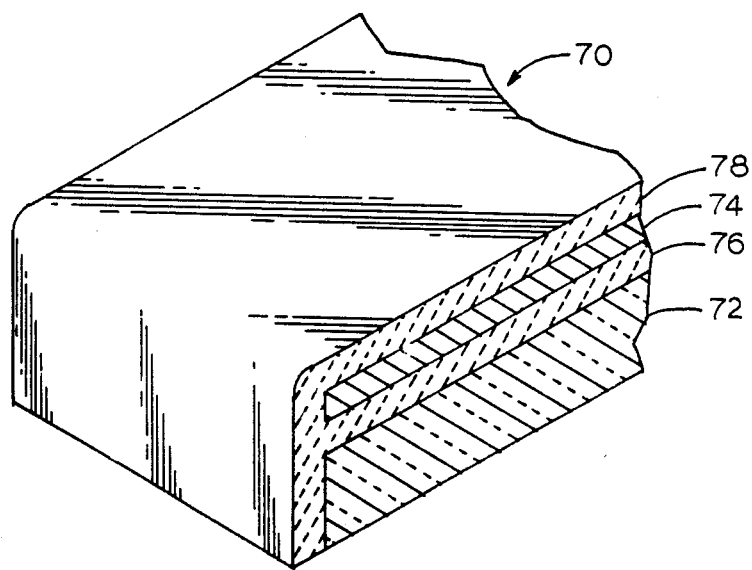
FIG. 5 is an enlarged cross-sectional view in perspective showing a mirror constructed with protective coatings and used as a front face mirror.

It is also significant that the silicon nitride coatings provide sufficient protection so that the paint coating can be eliminated. Therefore, as shown in FIG. 5, this structure can be used as a front surface mirror 70, which provides improved reflection and other optical properties not inhibited by transmission of the light through the glass substrate 72. A silicon nitride coating 76 is deposited on the glass substrate 72. The silver layer 74 is deposited onto the silicon nitride layer 76, and an enclosing layer of silicon nitride 78 is then deposited over the silver layer 74 and over the peripheral edges of these several layers 74, 76 and of the substrate 72. Since the silicon nitride layers 76, 78 are transparent, either side of the silver layer 74 can be used as the reflective surface of the mirror 70.

Figure 6:
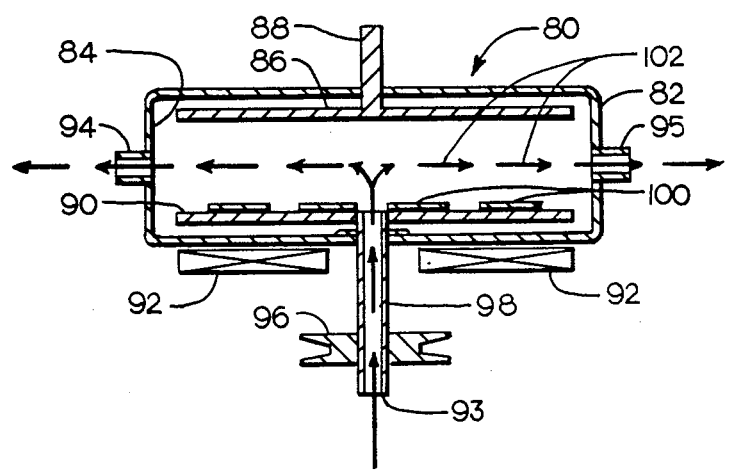
FIG. 6 is a diagrammatic cross-sectional view illustrating a parallel-plate plasma reactor used to deposit the protective coating according to this invention.

Silicon nitride is a product of the chemical reaction of silane, ammonia, and nitrogen induced by high temperature. A recently developed technique (not a part of this invention) utilizing a parallel plate, RF-powered plasma reactor, such as that illustrated in FIG. 6, is capable of producing a silicon nitride deposit from the chemical reaction of silane, ammonia, and nitrogen at temperatures in the range of 300° C. This technique is appropriate for depositing silicon nitride coatings on glass substrates used in mirror construction.

For purposes of illustration but not for limitation, the silicon nitride deposition process in the parallel plate plasma reactor 80 in FIG. 6 will be described. Other processes, such as sputtering, evaporation, ion plating, and the like could also be used. In this example, the reactor 80 has a housing 82 that encloses a chamber 84. A rotatable susceptor 90 is positioned in the chamber 84 and supported by a hollow rotating shaft 98. An electrode 86 is positioned in the chamber over and parallel to the susceptor 90, with an RF shielded power input 88 extending through the housing 82. Heaters 92 are positioned under the susceptor 90 for heating the chamber 84 to approximately 300° C.

A vacuum can be pulled on the chamber 84 through outlet ports 94, 95. The mixture of silane, ammonia, and nitrogen gas as is introduced into the chamber 84 through an inlet 93 in the hollow shaft 98. A rotation drive 96 imparts rotary motion to the susceptor 90, on which the substrates 100 to be coated are positioned.

In operation, the substrates 100 are positioned on the susceptor 90. A vacuum is pulled on the chamber 84, while the chamber 84 is heated to about 300° C. The mixture of silane, ammonia, and nitrogen gases is flowed through the chamber 84 over the substrates 100, as indicated by the flow arrows 102. An RF field is created between the electrode 86 and the susceptor 90. The combination of vacuum, heat, and electric charge in the chamber 84 creates a chemically reactive plasma of the gases, which results in deposition of a solid coating of silicon nitride on the substrates.

After the silicon nitride coating is deposited on the glass substrate, the silver can be deposited on the silicon nitride coating in a conventional process, such as wet chemical electroless deposition, vacuum evaporation, sputtering, or the like. Then the encapsulating coating of silicon nitride can be deposited by the process as described above over the silver layer to hermetically seal the mirror assembly.

Tests have indicated that reflectance of mirrors coated with silicon nitride is substantially the same as uncoated mirrors. Further, degradation of the silicon nitride coated mirrors in outdoor environments is greatly reduced from uncoated mirrors.

The foregoing is considered as illustrative only of the principles of the invention. For example, while this description and the explanation herein refer to silver mirrors on glass substrates, it should be understood that the structure and processes of this invention relating to silicon nitride diffusion barriers for mirrors is equally applicable to other metalized reflective surfaces, such as aluminum, copper, and the like. It is also applicable to other substrate materials, such as thin film ceramics, metals, and a variety of amorphous materials, including plastics, glassy sol-gel materials, and other amorphous materials that can withstand the temperature required for the silicon nitride deposition. Plastic materials in particular are much like glass in contributing to adverse chemical reactions that degrade silver or other reflective metals at the silver to substrate interface. Therefore, a silicon nitride coating between the silver and a plastic material in the substrate is effective to passivate the interface and retard or eliminate chemical degradation of the silver at the interface.

Present technology, as described above, requires approximately 300° C. temperatures, but future developments could result in lower temperature silicon nitride deposition processes. Further, the use of wet chemical electroless silver deposition processes in the description of this invention is for convenience only, since most commercial mirrors are fabricated by that or similar processes. This invention is equally applicable to metalized mirrors for which the reflective metal surfaces are deposited on the substrates by other processes, such as vacuum evaporation, sputtering, electroplating, or the like.

With some modifications, the silicon nitride passivation techniques of this invention can also be used with mirrors fabricated on flexible thin sheets or membrane substrates. Such thin sheet mirrors are currently being considered and tested for use on heliostats, parabolic troughs, and dishes in solar collector applications. Although silvered mirrors on glass substrates, such as those described above and shown in FIGS. 2-5, are also optically suitable for such heliostat and similar applications, they are too heavy, in-flexible, and fragile, and they require extensive, rigid support. On the other hand, the mechanical durability, structural strength, and flexibility of sheet metal substrates (e.g., stainless steel, aluminum, or copper foils) can minimize the costs of handling, shipping, and subsequent fabrication into solar mirrors. Furthermore, metal substrates are projected for use in stretched membrane reflectors for which glass substrates are totally inapplicable.

The smoothest commercially available stainless steel in thin sheet or foil form (0.001 to 0.040 in. thickness) has a peak-to-peak surface roughness in the range of 290 U to 1000 Å. This rough surface cannot achieve the 90% specular reflectance requirement desired and needed for efficient solar collector applications, where the percent specular reflectance is an indicator of the quality of a mirror surface measured by the percentage of light reflected from the surface with an angle of reflectance equal to the angle of incidence with respect to the plane of the surface. Such roughness does not allow for direct mirroring of the steel with a silver reflective layer, because silver deposited or plated on the stainless steel foil substrate conforms to, and has the same surface roughness as, the underlying substrate. Furthermore, cathodic/galvanic corrosion mechanisms at a silver/stainless steel interface quickly degrade and destroy the silver layer.

Considerable research effort has been directed toward utilizing a silicon dioxide layer produced from sol-gel on the stainless steel or other metal foil surface before depositing the silver layer on the surface. See, e.g., R. B. Pettit and C. J. Brinker, supra. The sol-gel process basically uses metal alkoxides [M(OR), where M=Si, B, Ti, Al, etc. and R is an alkyl group, e.g., $CH_3$, $C_2H_5$, $C_3H_7$, etc.]as glass precursors, which are then catalyzed to precipitate as thin, glassy films by an acid or base in alcohol solutions at elevated temperatures. At this time, silicon dioxide is the preferred sol-gel coating, but future developments could utilize other oxides. Therefore, for the purposes of this description, reference is made most often to silicon dioxide for convenience; however, it should be understood that this inventive concept applies also to passivating silver and other metal interfaces with other sol-gel produced glassy or ceramic type oxides. Essentially, the stainless steel foil can be dipped in the sol-gel, air dried, and then heated to boil out the solvents. This process leaves a thin layer of silicon dioxide or other oxides on the stainless steel foil surface. Obviously, these sol-gel coatings are essentially thin film forms of bulk glass or ceramic.

The initial thrust of the sol-gel research effort was to provide a protective coating around the silver layer and, particularly, to prevent the corrosion of the silver layer at the silver/stainless steel interface. However, it was found that the silicon dioxide layer, which is essentially glass, does not prevent degradation of the silver and, in fact, may even contribute to the degradation, for the reasons discussed in the "Background" section above. Essentially, the silicon dioxide or glass is chemically incompatible with the silver layer in outdoor environments, which results in rapid degradation of the silver layer.

On the other hand, the silicon dioxide sol-gel process has been shown to be very effective in planarizing commercially available stainless steel foil sheets. A layer of silicon dioxide in the order of about 5,000 Å thick derived from the above-described sol-gel process effectively fills in the surface roughness of the stainless steel sheet and provides a smooth, planar surface on which to deposit the reflective silver layer. Silvered mirrors fabricated with this process have specular reflectance capabilities of sufficient quality to satisfy the optical requirements necessary for solar mirror applications.

Figure 7:
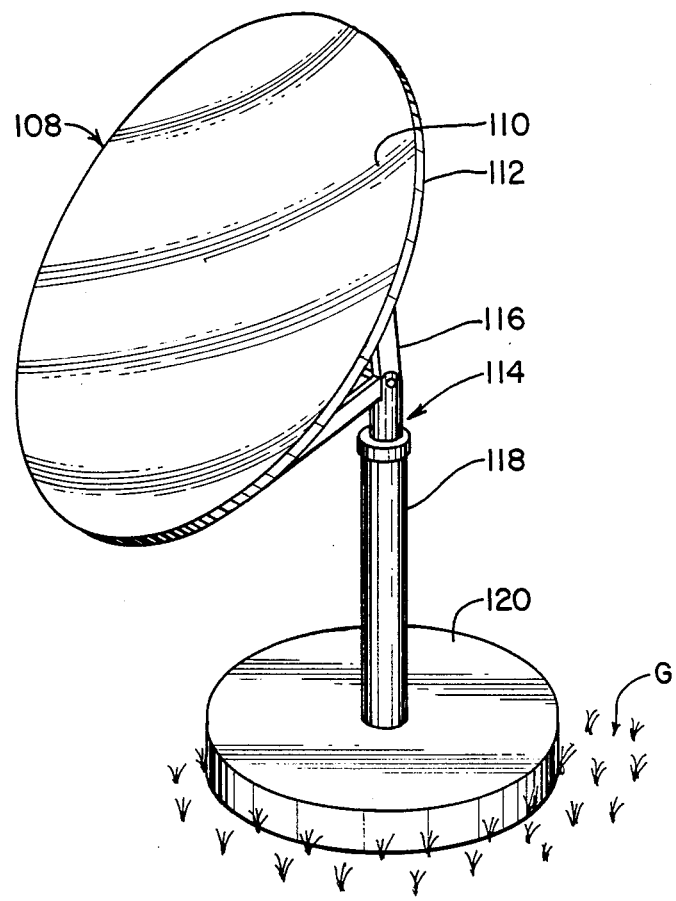
FIG. 7 is a perspective, conceptual view of a heliostat structure equipped with a mirror surface constructed on thin sheet substrate for its lightweight, flexible attributes in solar collector applications.

In FIG. 7, a heliostat 108 is shown having a thin sheet, flexible silvered mirror 110 stretched over a frame 112 and mounted on a support structure 114. The support structure 114 can include a superstructure framework 116 on which the mirror frame 112 is mounted. The superstructure framework 116 is pivotally mounted on a pedestal 118, which is attached to a support pad 120 on the ground G. Examples of such heliostat and other solar mirror applications can be found in U.S. Pat. No. 4,487,196, issued to L. Murphy.

Figure 8:
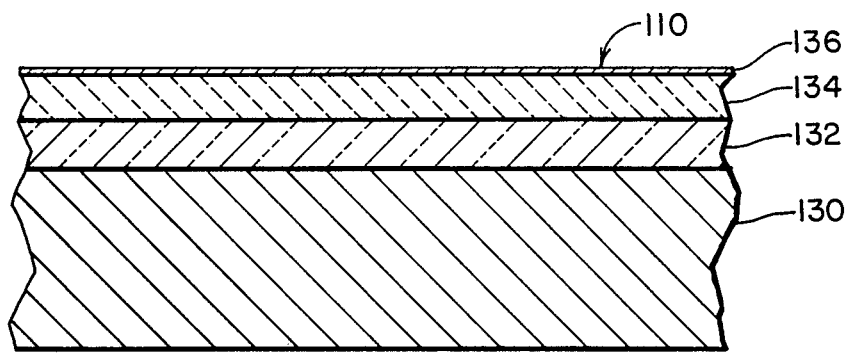
FIG. 8 is an enlarged, cross-sectional view of a thin sheet mirror structure having a metal foil substrate planarized with $SiO_2$ and having a silver/$SiO_2$ interface passivated with a silicon nitride layer according to this invention.

Referring now to FIG. 8, an enlarged cross-section of a thin sheet silvered mirror 110 according to the present invention and adapted for such uses as in heliostats and other solar mirror applications is shown. The mirror 110 comprises a thin, flexible metallic sheet 130, such as rolled stainless steel, aluminum or copper foil. The smooth, planar-surfaced layer 132, preferably glassy, silicon dioxide derived from sol-gel, as described above, coats the rougher surface of the metallic layer 130. The thin, metallic sheet 130 and planar-surfaced, glassy layer 132 form the lightweight, flexible, substrate for the silvered mirror 110.

A thin film of silicon nitride 134 is then deposited on the planar surface of the silicon dioxide layer 132 before the thin film, reflective, silver layer 136 is deposited on the substrate. Therefore, the silicon nitride layer 134 is sandwiched between the silver layer 136 and the substrate, which comprises the silicon dioxide or other glassy or ceramic layer 132 coated on metal foil 130. The silicon nitride layer 134 effectively passivates the silver/silicon dioxide (glass) interface by isolating those materials from each other, as described above for the silver mirrors on glass substrates. The result is a very durable, flexible, and lightweight silvered mirror structure 110 that has long useful-life capability with minimum degradation of the silver reflective layer 136.

Figure 9:
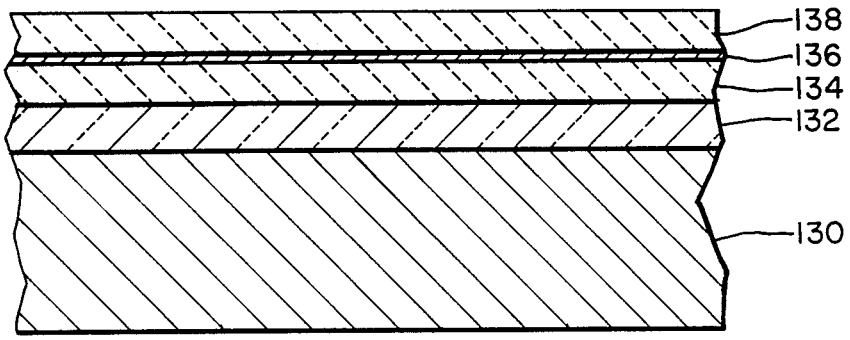
FIG. 9 is a structure similar to that shown in FIG. 8 and also including a silicon nitride protective overlayer coating.

For even further protection from environmental and adverse conditions, an additional exterior layer of silicon nitride 138 can be deposited over the silver layer 136, as shown in FIG. 9. This latter, exterior layer of silicon nitride 138, along with the interfacing, interior layer 134, completely encapsulates the silver layer 136 in silicon nitride, similar to the embodiment 70 shown in FIG. 5 and described above for the silvered mirror on bulk glass.

For example, and not for limitation, the metal foil 130 of the flexible mirror embodiment 110 can be thin-rolled stainless steel aluminum, or copper sheets or foil in the range of 0.007 to 0.010 inch (180 to 250 micrometers) thick. The glassy planarizing layer 132 can be about 10,000 Å (1 micrometer) thick; the silicon nitride layer 134 can be about 10,000 Å (1 micrometers) thick; and the silver layer 136 can be about 1000 Å thick. As in the bulk glass embodiments described above, a sensitizer (not shown) can be applied to the silicon dioxide layer 132 before the silicon nitride layer 134 is deposited thereon. The silicon nitride layers 134, 138 can be deposited as described above for the bulk glass mirrors, and the silver layer 136 can be deposited by any conventional technique, such as wet chemical electroless deposition, vacuum evaporation, sputtering, or the like. The sol-gel process described above is preferred for depositing the silicon dioxide or other oxide layer 132, because it fills the rough surface of the metal sheet 130 and leaves a smooth, planar surface for the silicon nitride 134 and silver 136 layers. Other deposition methods, like sputtering, would leave the silicon dioxide surface with the same contour or roughness as the underlaying metal sheet, and the subsequent silicon nitride and silver layers would also have the same rough surfaces. Such rough surfaces, particularly of the silver surface, would cause larger cone angles of reflected rays, thus light scattering, rather than good quality, spectral reflectance. Also, as described above, other suitable metals, such as aluminum or copper, for example, can also be used instead of silver for the reflective layer 136.

Figure 10:
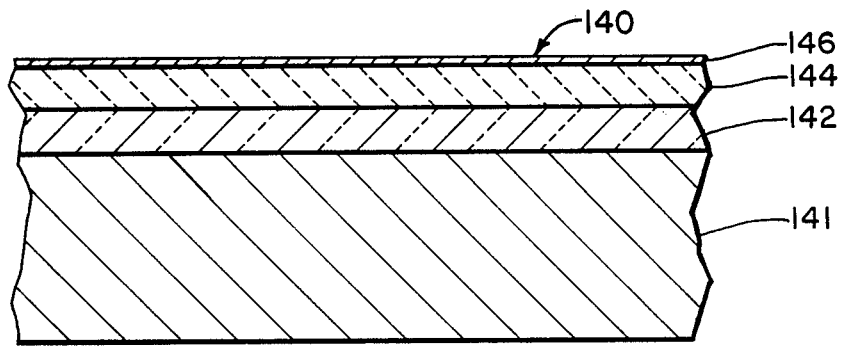
FIG. 10 is an enlarged, cross-sectional view of a thin sheet mirror structure comprising a polymer substrate and glassy layer with a silver/glass interface passivated with a silicon nitride layer.
Figure 11:
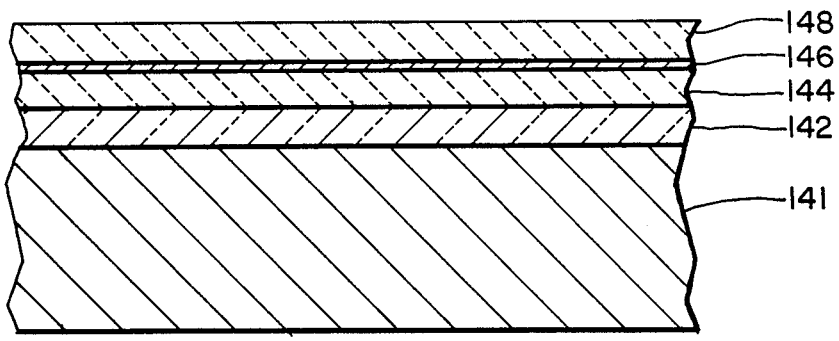
FIG. 11 is a structure similar to that shown in FIG. 10 and also including a silicon nitride protective overlayer coating.

FIG. 10 illustrates in cross-section another thin, flexible mirror embodiment 140 comprising a polymer plastic sheet 141 with a glassy layer 142 coated thereon for a mirror substrate. In this kind of embodiment, the glassy layer 142 would have to be deposited on the polymer sheet 141 by a different process, such as sputtering or vacuum evaporation, because the sol-gel process, at least with current technology, has to be heated to too high of a temperature to boil out the solvents, as described above. However, the polymer sheet 141 itself has very smooth, planar surfaces, so the glassy layer 142, as well as the subsequent silicon nitride 144 and silver 146 layers would also take on the same smooth planar surfaces. FIG. 11 is similar to FIG. 10, but shows an additional exterior silicon nitride encapsulating layer 148, as in the previously described embodiments of FIGS. 5 and 9.

As previously noted, the glassy layer 142 can be a thin film ceramic material, and the silicon nitride layer 144 is effective to prevent chemical degradation between the silver and the thin film ceramic as well. Therefore, for purposes of this invention, the glassy layer can be construed to include thin film ceramic materials as well as the more pure silicon dioxide and other traditional glassy products.

Figure 12:
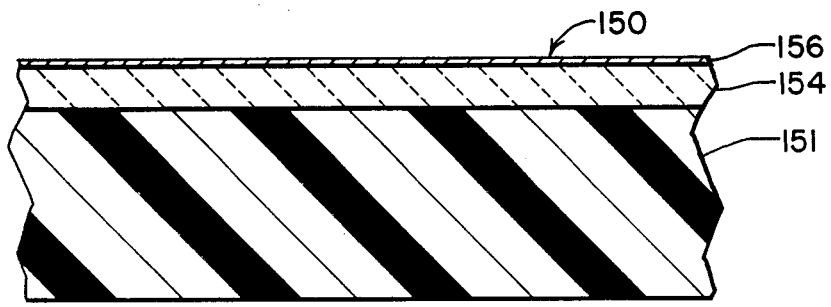
FIG. 12 is an enlarged, cross-sectional view of an alternate thin sheet mirror structure comprising a polymer substrate and a silver/polymer interface passivated with a silicon nitride layer.
Figure 13:
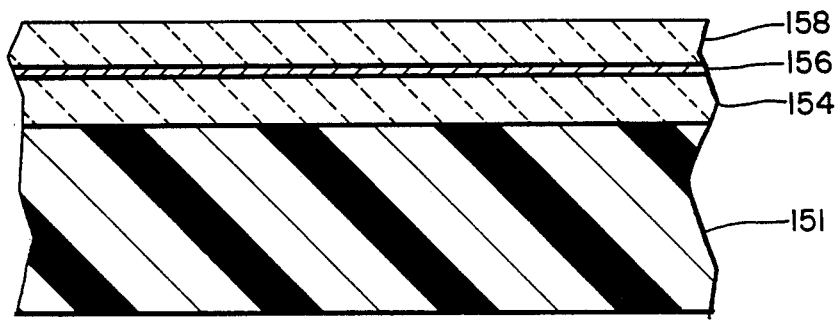
FIG. 13 is a structure similar to that shown in FIG. 12 and also including a silicon nitride protective overlayer coating.

The embodiment 150 shown in FIG. 12 shows the interface silicon nitride layer 154 deposited directly on a thin sheet polymer substrate 151, with the silver layer 156 deposited on the silicon nitride 154. This structure is feasible without a glassy layer to provide a smooth, planar surface for the silicon nitride layer 154, because the polymer 151 already has a smooth, planar surface. Therefore, the silicon nitride layer 154 deposited on the polymer substrate 151 will have a smooth, planar surface, so the silver layer 156 will also have a smooth planar surface. FIG. 13 shows the embodiment 150 of FIG. 12 with an exterior silicon nitride layer 158 for encapsulating the silver layer 156, as in the FIGS. 5, 9, and 11 embodiments.

The embodiments 140 and 150 described above with substrates comprising polymer sheets 141, 151 have the advantage of planar surfaces on the polymer sheets 141, 151. However, the embodiment 110 with the substrate comprising a metal sheet 130 has the advantage of being much stronger, particularly in tensile strength, and is not so susceptible to stretching.

Since numerous modifications and changes will readily occur to those skilled in the art, it is not desired to limit the invention to the exact construction and operation shown and described, and accordingly all suitable modifications and equivalents are considered to fall within the scope of the invention as defined by the claims which follow.

The embodiments of the invention in which an exclusive property or privelege is claimed are defined as follows:

1. A mirror, comprising:
   a substrate comprising a thin, flexible sheet of metal foil with a glassy material coating a surface of said metal foil;
   a first diffusion barrier comprising silicon nitride deposited on said glassy coating of said substrate; and
   a reflective layer of metal deposited on said first silicon nitride diffusion barrier such that said first silicon nitride diffusion barrier is positioned between the glassy coating of said substrate and said reflective layer of metal for preventing leaching and diffusion from and through the glassy coating of said substrate to the reflective layer of metal and for avoiding physical contact with, and chemical reaction between, the substrate and the reflective layer of metal.

2. The mirror of claim 1, including a second diffusion barrier comprising silicon nitride deposited on the side of said reflective metal layer that is opposite said first silicon nitride diffusion layer for sandwiching said reflective metal layer between silicon nitride diffusion barriers while keeping said first silicon nitride diffusion barrier between the substrate and the metal.

3. The mirror of claim 2, wherein said glassy coating comprises silicon dioxide.

4. The mirror of claim 3, wherein said glassy coating is derived from a silicon dioxide-based sol-gel.

5. The mirror of claim 1, wherein said metal layer comprises silver.

6. The mirror of claim f2, wherein said metal layer comprises silver and said first silicon nitride diffusion barrier is in contact with the entire surface of the silver that faces said substrate and said second silicon nitride diffusion barrier covers the entire surface of the silver that faces opposite the substrate such that the entire silver layer is sealed in silicon nitride and not exposed directly to either the substrate or the environment.

7. A mirror comprising a flexible sheet substrate, a thin diffusion barrier layer of silicon nitride deposited on the substrate, and a thin film of reflective metal deposited on the silicon nitride layer.

8. The mirror of claim 7, wherein said flexible sheet substrate is comprised of a metal foil with a layer of glassy material coating a surface of the metal foil, and wherein said diffusion barrier layer of silicon nitride is deposited on said glassy material, such that said diffusion barrier silicon nitride layer is positioned between said glassy material and said reflective metal film.

9. The mirror of claim 8, wherein said glassy material comprises silicon dioxide.

10. The mirror of claim 9, wherein said glassy material is derived from a silicon dioxide-based sol-gel.

11. The mirror of claim 10, wherein said metal foil is comprised of thin-rolled stainless steel, and said reflective metal film is comprised of silver.

12. The mirror of claim 10, wherein said metal foil is comprised of thin-rolled aluminum, and said reflective metal film is comprised of aluminum.

13. The mirror of claim 7, wherein said flexible sheet substrate is comprised of a polymer.

14. The mirror of claim 8, wherein said glassy material comprises a ceramic.

15. In a reflective metallic mirror, wherein a layer of reflective metal deposited on a substrate comprising an amorphous material forms a reflective surface, the improvement comprising:

a protective diffusion barrier comprised of a layer of silicon nitride positioned between the reflective metal layer and the amorphous substrate material for protecting the reflective metal layer and the interface of the metal layer with the amorphous material substrate from exposure to harmful precipitates of moisture, alkalis, and other impurities during exposure of the mirror to ambient environmental substances.

16. The improvement of claim 15, wherein said substrate comprises a thin, flexible, metal foil sheet with an amorphous glassy material coating on one surface of the metal foil sheet, and wherein said layer of silicon nitride is deposited on said amorphous glassy material.

17. The improvement of claim 16, wherein said glassy material comprises silicon dioxide.

18. The improvement of claim 17, wherein said glassy material is derived from a silicon dioxide-based sol-gel.

19. The improvement of claim 16, wherein said glassy material comprises a ceramic.

20. The improvement of claim 16, wherein said reflective metal comprises silver.

21. The improvement of claim 15, wherein said substrate comprises a thin, flexible sheet of polymer.

22. A method for fabricating a long-lasting mirror capable of long-term use as an effective reflector in solar collector applications, said method comprising the steps of:

coating a surface of a thin, flexible metal sheet substrate with a planarizing glassy material;

depositing a first diffusion barrier layer comprising silicon nitride on the glassy material coating; and depositing a reflective layer of metal on the surface of said first silicon nitride diffusion barrier that is opposite said substrate such that said silicon nitride diffusion barrier is positioned between the reflective layer and the glassy substrate coating.

23. The method of claim 22, wherein said reflective layer of metal comprises silver and said glassy substrate coating comprises silicon dioxide.

24. The method of claim 22, wherein said metal sheet substrate comprises thin rolled stainless steel foil.

25. The method of claim 22, wherein said metal sheet substrate comprises a thin rolled metal foil sheet selected from the group consisting of stainless steel, aluminum, and copper.

* * * * *